Patented Dec. 19, 1950

2,534,263

UNITED STATES PATENT OFFICE 2,534,263

METHOD OF FIRMING FRUIT AND
VEGETABLE SLICES

Claude H. Hills, Philadelphia, Pa., assignor to the
United States of America as represented by the
Secretary of Agriculture No Drawing. Application July 18, 1947,
Serial No. 762,013

11 Claims. (Cl. 99—103)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to treatment of fruits and vegetables, and more particularly, to methods of improving the consistency of processed vegetable and fruit products.

At the present time, a considerable portion of the annual fruit and vegetable crop cannot be utilized for commercial processing such as canning, pickling, freezing, or other preservation processes, and is wasted or diverted to less economical uses because the fruits or vegetables are too soft to withstand treatment by conventional methods. The lack of firmness of the plant tissue which causes it to disintegrate on subsequent processing and handling may be due to overripe condition or may constitute an inherent characteristic of a given variety.

An object of this invention, accordingly, is to provide methods for improving the consistency of processed fruit and vegetable tissues. Another object is to provide means for inhibiting the disintegration of fruits and vegetables during preservation processes. A further object is the production of improved fruit and vegetable products. Other objects and advantages will be apparent from the description of the invention.

I have found that the consistency and cohesion of fruit and vegetable tissue are improved by subjecting the tissue to the action of an agent capable of de-esterifying pectin. Pulpy plant tissues, that is, the tissues of fruit and vegetables, contain pectin as a constituent of the cell walls. As the tissues mature, this pectin is gradually converted to a more soluble form, and as a result of this change, the cell walls become less rigid and the consistency of the tissues decreases.

It is known that pectin can be hydrolyzed or de-esterified to yield pectic and pectinic acids— a series of derivatives which differ from pectin in being capable of reacting with calcium salts to form stable gels. Hydrolysis of pectin to derivatives capable of yielding gels by interaction with calcium salts can be brought about by the action of dilute alkalies and acids, or by enzymes such as pectase.

According to the method of this invention, the consistency of pectin-containing fruit or vegetable slices is improved by contacting the slices with an agent capable of hydrolyzing pectin, preferably with the pectin de-esterifying enzyme, pectase. As a result of such treatment, a substantial firming of the fruit or vegetable slices is effected, and the treated products do not readily disintegrate on subsequent cooking or when subjected to other conventional treatments used in preserving fruits and vegetables.

Although my invention is not limited to any particular hypothesis as to the mechanism of the process, it appears likely that the increased firmness of plant tissue resulting from the action of a pectin hydrolyzing agent is caused by the interaction of pectin hydrolysis products with calcium salts present as natural constitutents of the cellular liquid.

The beneficial effect resulting from the action of the pectin hydrolyzing agent is enhanced by the presence of added calcium salts.

The treatment of fruit and vegetable slices with a pectin hydrolyzing agent, particularly the enzyme pectase, and the resulting improvement in the consistency of the plant tissue can be effected by soaking the fruits or vegetables in an aqueous solution of the enzyme for a length of time sufficient to impart the desired degree of firmness to the material treated. The enzyme action is accelerated by conducting the treatment at a favorable pH, the most favorable conditions being attained by maintaining the pH of the solution within the range of 33.8 to 6.0 by addition, if necessary, of suitable buffers, such as sodium acetate.

The length of time of the treatment may be reduced by conducting the process at an elevated temperature, as for example, at about from 120° to 140° F.; also by subjecting the material treated to reduced pressure, the enzyme solution can be forced into the interstices of the plant tissue, displacing the occluded air and bringing the enzyme into intimate contact with the pectin of the cell wall. Thus, the treatment of fruits with pectase is readily adaptable for use in combination with conventional steps of processing methods.

As illustrative embodiments of a manner in which my invention may be carried out in practice, the following examples are given.

EXAMPLE I

McIntosh apples, which had been in storage for 6 months and thus were quite over-ripe and soft, were peeled, cored, and sliced into eighths. Approximately 150 grams of apple slices were placed into a pint Mason jar and covered with a mixture of 200 cc. distilled water and 50 cc. tomato pectase solution prepared by the method of Willaman and Hills described in United States Patent 2,358,430. The jar was evacuated and held at a vacuum of about 26 inches of mercury for about 2 minutes. The vacuum was then released and the apple slices were allowed to stand in contact with the solution for approximately one hour at room temperature. The slices were then placed in a jar filled with water heated to boiling, and cooked by placing the jar in boiling water for 20 minutes.

A second batch of apple slices was treated exactly in the same manner, except that 1.8 grams (500 mol. equivalent) of calcium chloride was added to the impregnating solution.

Control experiments, using distilled water and a solution of 1.8 grams calcium chloride in 250 cc. of distilled water as the impregnating solutions, were run following the above-described procedure. The results obtained are shown in the following table.

Table I

| Experiment No. | Impregnating Solution | | | Cooked Apple Slices | |
|---|---|---|---|---|---|
| | Water, cc. | Pectase Soln., cc. | CaCl₂·2H₂O gm. | Consistency | pH |
| 1 | 200 | 50 | None | Firm | 3.8 |
| 2 | 200 | 50 | 1.8 | Very firm | 3.8 |
| 3 (control) | 250 | None | None | Mushy—sauce consistency | 3.7 |
| 4 (control) | 250 | None | 1.8 | do | 3.7 |

EXAMPLE II

Apple slices were treated according to the procedure described in Example I and using a purified pectase solution prepared from tomatoes by the following method.

Firm, ripe tomatoes were ground to a pulp, mixed with 2 percent, by weight, of sodium chloride, and filtered. The clear serum obtained as the filtrate and containing the enzyme, was dialyzed against distilled water. The enzyme precipitate thus obtained was separated by decantation and dissolved in a small volume of a 2 percent aqueous NaCl solution. The activity of this extract was 0.0725 P. E. U. (as defined by Lineweaver and Ballou, 1945, Arch. Biochem. 6, 373).

The results obtained are summarized in the following tabulation of experimental data.

Table II

| Experiment No. | Impregnating Solution | | | | Cooked Apple Slices | |
|---|---|---|---|---|---|---|
| | Water, cc. | Pectase Soln., cc. | Ca-Chloride (0.5 N Soln.), cc. | Na-Acetate (2 N Soln.), cc. | Consistency | pH |
| 5 | 200 | 20 | 25 | 5 | Tough | 4.9 |
| 6 | 205 | 20 | 25 | None | Firm | 4.0 |
| 7 | 215 | 10 | 25 | None | Medium | 4.0 |
| 8 | 220 | 5 | 25 | None | Tender | 4.0 |
| 9 (control) | 225 | None | 25 | None | Very soft | 4.0 |
| 10 (control) | 250 | None | None | None | Mushy | 4.0 |

It is apparent from the above data that it is possible to vary the degree of firmness imparted to the tissue by regulating the extent of enzyme action. In Experiment No. 5, the enzyme action was accelerated by addition of a buffer, sodium acetate, to provide a more favorable pH. Nearly any desired degree of firmness may be imparted to the material treated by varying the amount of enzyme and buffer in the impregnating solution.

EXAMPLE III

Fresh carrot roots, cut into cylindrical pieces approximately 1 cm. long and 1.3 cm. in diameter, were treated according to the procedure of Example I and using a purified pectase solution prepared as described in Example II. The carrot pieces were then cooked in a pressure cooker for 30 minutes at 10 lbs. pressure, and tested for firmness, using a modified Delaware Jelly Tester (Baker, 1938. Fruit Prod. J. 17, 329). The results obtained are summarized in the following tabulation of experimental data, wherein the consistency of cooked carrot pieces is expressed in cm. water pressure required to compress the samples 15 percent.

Table III

| Experiment No. | Impregnating Solution | | | | Cooked Carrot Slices | |
|---|---|---|---|---|---|---|
| | Water cc. | Pectase Soln. cc. | Ca-Chloride (0.5 N Soln.) | Na-Acetate (2 N Soln.) | Consistency (cm. H₂O) | pH |
| 11 (control) | 347 | None | 20 | None | 55 | 5.0 |
| 12 | 345 | 2 | 20 | None | 84 | 5.3 |
| 13 (control) | 337 | None | 20 | 10 | 87 | 5.3 |
| 14 | 335 | 2 | 20 | 10 | 135 | 5.4 |

EXAMPLE IV

Potatoes, cut into cylindrical pieces approximately 1.2 cm. long and 1 cm. in diameter, were treated according to the procedure of Example I and using a purified pectase solution prepared as described in Example II. The potato pieces covered with the impregnating solution were subjected to a vacuum of about 28 inches of mercury for approximately 5 minutes and then allowed to stand in contact with the solution for approximately two hours at room temperature. The potato pieces were then cooked at 15 lbs. pressure for 30 minutes and tested for firmness as described in the foregoing example. The results obtained are listed in the following table.

Table IV

| Experiment No. | Impregnating Solution | | | Cooked Potato Pieces | |
|---|---|---|---|---|---|
| | Water, cc. | Pectase Soln., cc. | Ca-Chloride (0.5 N Soln.), cc. | Firmness [1] | pH |
| 15 | 347 | None | 20 | 58 | 5.16 |
| 16 | 347 | 5 | 20 | 70 | 5.12 |

[1] Firmness=pressure in cm. carbon tetrachloride required to compress the cooked potato cylinder 1.5 mm.

Although in the foregoing examples the process of my invention is described as applied to the treatment of apples, carrots, and potatoes, similar results are obtained by applying analogous procedures to the treatment of other fruits and vegetables such as, for example, pears, plums, and peaches. With non-porous fruits and vegetables containing little, if any occluded air, such as plums and peaches the evacuation treatment is not necessary. The sliced or halved fruit or vegetable is merely contacted with the enzyme containing solution. The principal effect is to firm the surface of the pieces eliminating ragged edges and reducing disintegration of the surfaces. This enables the pieces to hold their shape.

Pectase-containing preparations derived from other sources such as, for instance, alfalfa or eggplant, may be used instead of the enzyme obtained from tomatoes and may be utilized either in the form of an enzyme-containing plant extract or in concentrated form.

Any non-toxic, water soluble calcium salt and buffer may be used. Analogous results are obtained, for example, using calcium gluconate or calcium acetate instead of calcium chloride, and sodium carbonate or disodium phosphate instead of sodium acetate.

Having thus described my invention I claim:

1. A process comprising contacting a pectin-containing fruit or vegetable slice with an aqueous solution containing about from .4 to 5.8 P. E. U. of active pectase per 1000 cc. of the solution, whereby the firmness of said slice is increased, and then preserving the firmed slice.

2. A process comprising contacting a pectin-containing fruit or vegetable slice with an aqueous solution containing a calcium salt and about from .4 to 5.8 P. E. U. of active pectase per 1000 cc. of the solution, whereby the firmness of said slice is increased, and then preserving the firmed slice.

3. A process comprising contacting a pectin-containing fruit or vegetable slice with an aqueous solution containing about from .4 to 5.8 P. E. U. of active pectase per 1000 cc. of the solution at a pH of about from 3.8 to 6.0, whereby the firmness of said slice is increased, and then preserving the firmed slice.

4. A process comprising contacting a pectin-containing pomaceous fruit slice with an aqueous solution containing about from .4 to 5.8 P. E. U. of active pectase per 1000 cc. of the solution, whereby the firmness of said slice is increased, and then preserving the firmed slice.

5. A process comprising contacting a pectin-containing apple slice with an aqueous solution containing about from .4 to 5.8 P. E. U. of active pectase per 1000 cc. of the solution, whereby the firmness of the said slice is increased, and then preserving the firmed slice.

6. A process comprising contacting a pectin-containing apple slice with an aqueous solution containing a calcium salt and about from .4 to 5.8 P. E. U. of active pectase per 1000 cc. of the solution at a pH of about from 3.8 to 6.0, whereby the firmness of the said slice is increased, and then preserving the firmed slice.

7. A process comprising contacting a pectin-containing apple slice with an aqueous solution containing a calcium salt and about from .4 to 5.8 P. E. U. of active tomato pectase per 1000 cc. of the solution at a pH of about from 3.8 to 6.0, whereby the firmness of the said slice is increased, and then preserving the firmed slice.

8. A process comprising contacting a pectin-containing apple slice with an aqueous solution containing a calcium salt and about from .4 to 5.8 P. E. U. of active pectase per 1000 cc. of the solution at a pH of about from 3.8 to 6.0 and at a temperature of about from 120° F. to 140° F., whereby the firmness of the said slice is increased, and then preserving the firmed slice.

9. A process comprising contacting a pectin-containing apple slice with an aqueous solution containing calcium chloride and about from .4 to 5.8 P. E. U. of active pectase per 1000 cc. of the solution at a pH of about from 3.8 to 6.0, whereby the firmness of the said slice is increased, and then preserving the firmed slice.

10. A process comprising contacting a pectin-containing apple slice with an aqueous solution containing calcium chloride and about from .4 to 5.8 P. E. U. of active tomato pectase per 1000 cc. of the solution at a pH of about from 3.8 to 6.0 at a temperature of about from 120° F. to 140° F., whereby the firmness of the said slice is increased, and then preserving the firmed slice.

11. A process comprising contacting a pectin-containing apple slice with an aqueous solution containing calcium chloride and about from .4 to 5.8 P. E. U. of active tomato pectase per 1000 cc. of the solution at a pH of about from 3.8 to 6.0 under reduced pressure, whereby the firmness of the said slice is increased, and then preserving the firmed slice.

CLAUDE H. HILLS.

REFERENCES CITED

The following references are of record in the file of this patent:

UNITED STATES PATENTS

| Number | Name | Date |
|---|---|---|
| 1,513,615 | Leo | Oct. 28, 1924 |
| 1,934,810 | Mazzola | Nov. 14, 1933 |
| 1,991,242 | Cole | Feb. 12, 1935 |
| 2,291,704 | Fisher | Aug. 4, 1942 |

(Other references on following page)

UNITED STATES PATENTS

| Number | Name | Date |
|---|---|---|
| 2,333,873 | Martin | Nov. 9, 1943 |
| 2,406,840 | Leo | Sept. 3, 1946 |

OTHER REFERENCES

"The Effect of Calcium on Plant Tissues," by Z. I. Kertesz, vol. 88, #7, page 26, 1938, The Canner.

"The Effect of Calcium Salt in Canning Tomatoes," by Maurice Siegel, vol. 90; #2, pp. 12–13, 1939, The Canner.

"Pectin," by Elwell, pp. 47, 52, 54, and 55, Jan. 1939 ed., published by Belle Reeves, Secretary of State W. P. A. Project No. 2839.

"Polyphosphates in the Extraction of Pectin," by Baker and Woodmansee, pp. 164–165. Published by the "Fruit Growers Journal and American Food Manufacturer," February 1944.